United States Patent
Zweigle et al.

(10) Patent No.: US 11,951,823 B2
(45) Date of Patent: Apr. 9, 2024

(54) INSULATING DEVICE WITH COOLING MEDIUM LINE

(71) Applicant: Robert Bosch GmbH, Stuttgart (DE)

(72) Inventors: Peter Zweigle, Ditzingen (DE); Johannes Riedl, Munich (DE); Philipp Breinlinger, Ludwigsburg (DE); Heiko Wurster, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 624 days.

(21) Appl. No.: 17/275,742

(22) PCT Filed: Aug. 22, 2019

(86) PCT No.: PCT/EP2019/072471
§ 371 (c)(1),
(2) Date: Mar. 12, 2021

(87) PCT Pub. No.: WO2020/057891
PCT Pub. Date: Mar. 26, 2020

(65) Prior Publication Data
US 2022/0037963 A1    Feb. 3, 2022

(30) Foreign Application Priority Data
Sep. 19, 2018  (DE) ............... 10 2018 215 889.4

(51) Int. Cl.
*H02K 5/20* (2006.01)
*B60K 11/02* (2006.01)
*H02K 5/15* (2006.01)
*H02K 5/22* (2006.01)
*H02K 9/197* (2006.01)

(52) U.S. Cl.
CPC ............. *B60K 11/02* (2013.01); *H02K 5/15* (2013.01); *H02K 5/20* (2013.01); *H02K 5/225* (2013.01); *H02K 9/197* (2013.01); *H02K 5/203* (2021.01)

(58) Field of Classification Search
CPC ............................. H02K 1/20; H02K 5/203
See application file for complete search history.

(56) References Cited

U.S. PATENT DOCUMENTS 5,814,909 A     9/1998  Yamada et al.
2008/0042498 A1* 2/2008  Beer .................. H02K 1/20
                                          310/43

(Continued)

FOREIGN PATENT DOCUMENTS

DE       2342753     3/1974
DE    112012002552   3/2014

(Continued)

OTHER PUBLICATIONS

International Search Report for Application No. PCT/EP2019/072471 dated Oct. 1, 2019 (English Translation, 2 pages).

*Primary Examiner* — Gary A Nash
(74) *Attorney, Agent, or Firm* — Michael Best & Friedrich LLP

(57) ABSTRACT

The invention relates to an insulating device (40) having integrated cooling medium channels (44, 46), comprising an insulating body (74) made of a plastic material (52, 60), in which conductor rails (18, 20, 22) are accommodated. The cooling medium channels (44, 46) are integrated into the plastic material (52, 60) of the insulating body (74).

20 Claims, 5 Drawing Sheets

(56) References Cited

U.S. PATENT DOCUMENTS

2015/0381010 A1* 12/2015 Kobes .................. H02K 1/04
                                                      29/598
2018/0026493 A1*  1/2018 Jung ................... H02K 5/24
                                                      310/52

FOREIGN PATENT DOCUMENTS

| DE | 102012021600 | 5/2014 |
| DE | 102015216055 | 2/2017 |
| JP | H04265614    | 9/1992 |

* cited by examiner

INSULATING DEVICE WITH COOLING MEDIUM LINE

BACKGROUND OF THE INVENTION

The invention relates to an insulating device with a cooling-medium line, which is used to dissipate heat losses of a stator of an electric machine. The invention furthermore relates to the use of the insulating device in an electric machine of a vehicle having at least one electric machine.

DE 10 2012 021 600 A1 relates to an electric motor. The electric motor comprises a housing, with a stator, a rotor and a rotary transmitter. The rotary transmitter has a primary-side first device with a primary winding and a secondary-side second device with a secondary winding. The housing has a first receptacle for the positioning of the primary-side first device. The primary-side first device comprises a number of first fastening points for force-fitting and/or form-fitting fastening on the housing. The rotor comprises a second receptacle for the positioning of the secondary-side second device, wherein the secondary-side second device has a number of second fastening points for force-fitting and/or form-fitting fastening on the rotor. The rotor contains a first connection device and the secondary-side second device contains a second connection device for the electrical connection of the rotor to the secondary-side second device. The first connection device has first electrical contact members and the second connection device has second electrical contact members for a releasable line connection by means of form fit and/or force fit.

DE 10 2015 216 055 A1 relates to the cooling system of an electric machine. The cooling system comprises at least one end shield and at least one coolant distributor plate, wherein the end shield and the coolant distributer plate are designed to form a cooling channel together. The cooling channel comprises a plurality of horizontal cooling channel portions, which extend parallel to a rotary axis of the electric machine. The cooling channel further comprises a plurality of vertical cooling channel portions, which extend perpendicularly to the rotary axis of the electric machine. A plurality of radially extending cooling channel portions are further provided, which run around the rotary axis of the electric machine.

DE 11 2012 002 552 T5 relates to an electric motor. The electric motor comprises a shaft, which is provided with a rotor, a coolant passage formed therein so that a cooling medium can flow through. A housing is furthermore provided, in which the shaft is provided, wherein the shaft is rotatably mounted. A cooling-medium supply portion is provided, which extends within the housing from one end of the shaft on one side and routes the cooling medium to the inner cooling-medium passage. A rotary angle detection sensor is furthermore provided, which is mounted on the side of one end of the shaft and detects a rotary angle of the shaft.

The (three-phase) electric machines used, for example, on electric drive axles require electrical connection of the stator phases for operation. If further distances to the control electronics have to be overcome, the phase currents are routed via copper busbars. These busbars have a relatively large cross-section in order to keep the ohmic resistance and temperature rise as low as possible. In order to maintain the required clearance and creepage distances, the busbars are held in an insulating piece made from plastic.

To dissipate the heat losses, the stator of the electric machine is frequently water-cooled. The cooling water is supplied and discharged in the region of the end shield, for example. Between these connection points, the cooling water is routed in the machine housing for the purpose of heat absorption. Since the connection of the internal cooling-water routing and the desired connection direction of the cooling-water hoses often call for unfavorably curved feed regions which can only be produced with great difficulty in a casting technique, they are generally formed with fitted tubes made from plastic or metal.

SUMMARY OF THE INVENTION

According to the invention, an insulating device with integrated cooling-medium channels is proposed, which comprises an insulating body made from a plastic material, in which busbars are received. The cooling-medium channels are integrated in the plastic material of the cooling body.

As a result of the solution proposed according to the invention, a cooling-water routing which is otherwise difficult to produce, in particular when produced as cast components, can be advantageously avoided. As a result of the solution proposed according to the invention, a lowering of the temperature level of the busbars in the insulating device can be advantageously achieved.

In a development of the idea proposed according to the invention, the insulating device can be formed either in a single-part embodiment or in a multi-part embodiment.

The integrated cooling-medium channels are advantageously injection molded in the region of the end face of the insulting body of the insulating device proposed according to the invention. In manufacturing terms, the injection molding of the cooling-medium channels from the plastic material from which the insulating body is manufactured can be realized in a particularly simple manner within the injection molding process of a plastic material.

The cooling-medium channels advantageously extend in the insulating body of the insulating device such that they run substantially in the vertical direction.

As a result of the solution proposed according to the invention, the busbars, which are incorporated in the insulating body, can be advantageously insulated from one another, and pipe elbows in which the cooling-medium flows can be integrated in the insulating body of the insulating device.

The insulating body of the insulating device proposed according to the invention is produced from an electrically insulating plastic material optimized for the best possible heat conduction. This is, for example, a plastic material such as Luvocom 1-8259 or Tecacomp PA 66 TC 3923, for example. As a result of the solution proposed according to the invention, the production of complicated cooling-medium channels via mold cores or intersecting bores can be advantageously avoided without the need for additional components such as separate connection fittings and the like, for example. As a result of the solution proposed according to the invention, particularly space-saving and simple cooling of the busbars can be achieved, so that the ohmic resistance and temperature rise thereof under high loads remains as low as possible.

The insulating device proposed according to the invention can be formed either in a single-part embodiment or a multi-part embodiment. In the case of a multi-part embodiment, for example, the individual parts of the insulating body can be manufactured from mutually different plastic materials. On the other hand, there is also the option of manufacturing the two parts of a multi-part embodiment of the insulating body from one and the same plastic material. The parts of the insulating body—in the case of a multi-part embodiment—abut against one another along a joint, wherein two busbars are arranged in a first part of the insulating body in a multi-part embodiment, for example, and only one busbar is arranged in a second part of the insulating body, which is designed to be complementary to said first part, or vice versa.

In the case of a single-part embodiment of the insulating body of the insulating device proposed according to the invention, this insulating body can be advantageously manufactured from one material, wherein, in particular, the integrated cooling-medium channels can be injection molded at the end face of the insulating device.

Instead of busbars designed in a flat structure, punched from sheet metal or formed in some other manner, wires in various embodiments can also be used. For example, a solid wire with a circular or other cross-section can be used, furthermore wrapped or braided litz wires. When using busbars formed in this manner, the corresponding receiving geometry in the material of the insulating body is designed to be complementary to the geometry of the busbar used in each case. The thermal coupling of the conductors to the plastic surface of the insulating body can be improved by heat-conducting paste, which applies both for the use of busbars in a flat structure and also for the use of busbars in wire form—as presented above.

The invention furthermore relates to the use of the insulating device with integrated cooling-medium channels for cooling an electric machine of a vehicle having at least one electric machine, be it an electric vehicle (EV), be it a hybrid electric vehicle (HEV) or be it a plug-in hybrid electric vehicle (PHEV). For example, when using the solution proposed according to the invention in the case of hybrid electric vehicles, for example, the cooling medium circuit of the internal combustion engine can, advantageously, also be simultaneously used for cooling the at least one electric machine of a hybrid electric vehicle without the need for a separate cooling-medium circuit in a hybrid electric vehicle.

The solution proposed according to the invention advantageously provides the option of simplifying housing parts for electric machines, since, as a result of the solution proposed according to the invention, the production of complicated cooling-medium channels via mold cores in cast parts or intersecting bores in cast parts can be avoided without the need for additional components such as separate connection fittings or the like, for example. As a result of the solution proposed according to the invention, the busbars routed in the insulating body of the insulting device can be cooled very easily and efficiently and kept to a low temperature value which is advantageously favorable for the ohmic resistance. As a result of the solution proposed according to the invention, it is possible to achieve a considerable reduction in the effort which is otherwise involved with regard to the cooling-medium routing. As a result of the insulating device proposed according to the invention, which has integrated cooling-medium channels, a lowering of the temperature level in the region of the busbars in the insulting body can be achieved; furthermore, as a result of the solution proposed according to the invention, efficient and reliable electrical insulation of the busbars with respect to one another can, in particular, be achieved. In contrast to previously applied solutions when using pipe elbows and the like which have to be subsequently insulated, the solution proposed according to the invention enables the number of components to be reduced, seals to be omitted and, in particular, a leak-free cooling-medium routing to be ensured.

The solution proposed according to the invention is notable for a reduction in weight when compared to a solution in which the entire channel routing extends in an end shield manufactured from aluminum and the dimensions of this end shield have to be correspondingly larger.

BRIEF DESCRIPTION OF THE DRAWINGS

The invention is described in more detail below with the aid of the drawing, which shows.

DETAILED DESCRIPTION

Figure 1:
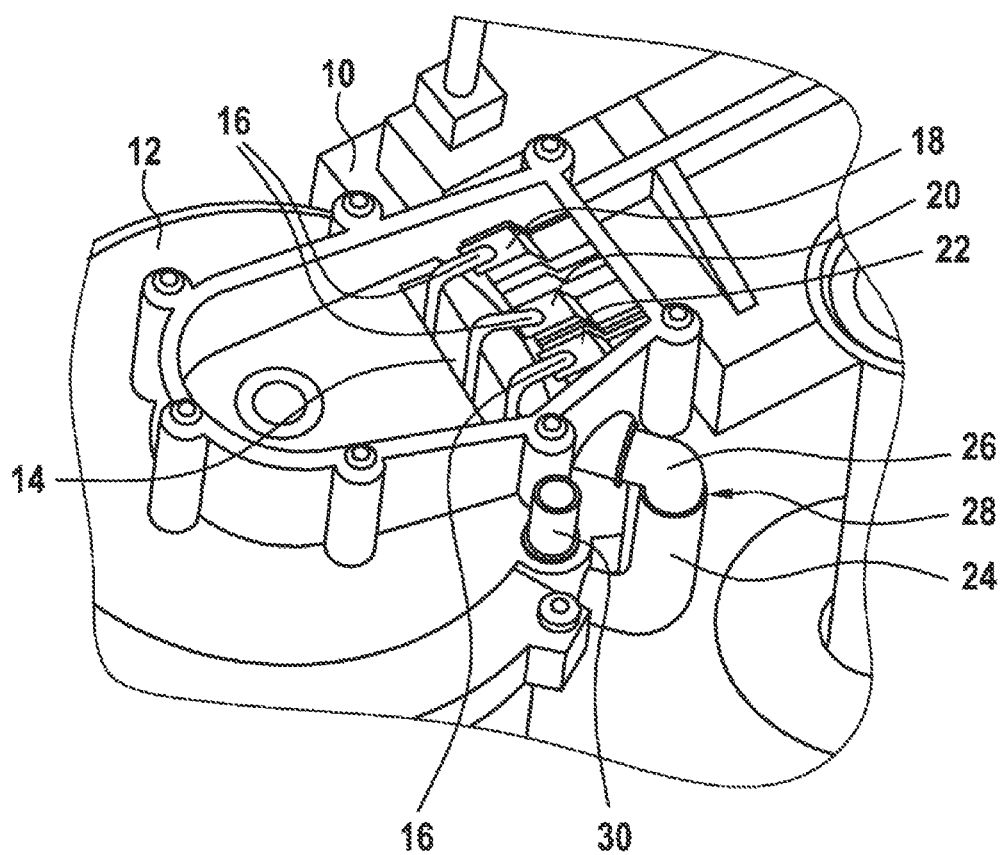
FIG. 1 a perspective view of an electric axle module with an end shield for an electric machine and a power electronics system.

The illustration in FIG. 1 reveals a perspective view of an electric axle module.

The illustration according to FIG. 1 presents a lateral perspective view of an electric axle module, wherein, in particular, an end shield 12 of a housing is illustrated. Above the end shield 12, which covers most of an electric machine 14, part of a power electronics system 10 is illustrated. Electrical connections (not illustrated in FIG. 1), via which a current is supplied to the electric machine 14 (not illustrated in FIG. 1), are received in the power electronics system 10. Phase connections 16 run respectively from the electric machine 14 to a first busbar 18, a second busbar 20 and a third busbar 22.

The perspective view according to FIG. 1 furthermore reveals that a cooling-medium routing 24 comprises a pipe elbow 26. This is, for example, a feed 28 for a cooling medium, whilst the return 30 (likewise illustrated in a perspective view in FIG. 1) serves to return the cooling medium.

Figure 2:
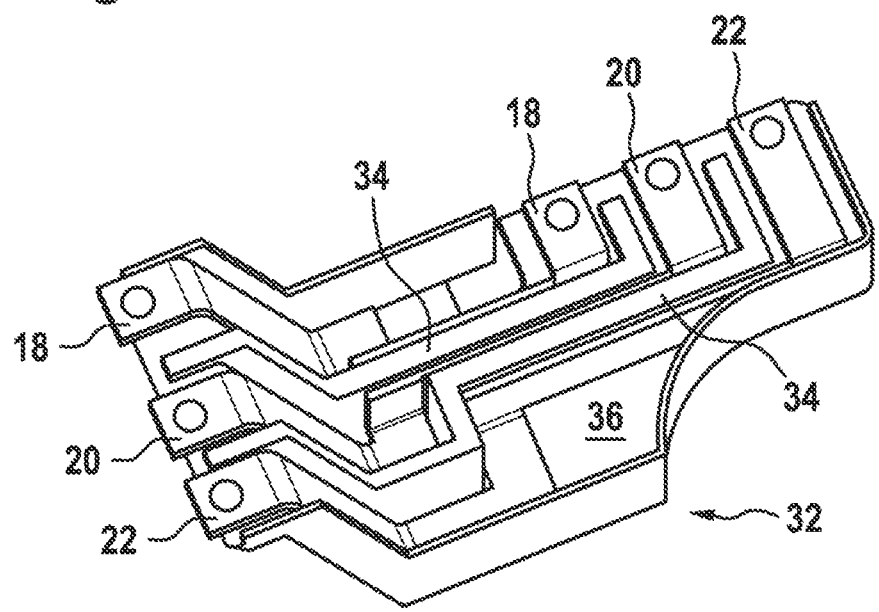
FIG. 2 a perspective plan view of a hitherto used insulating piece including busbars.

FIG. 2 shows an insulating piece 32 in a perspective illustration. The insulating piece is surrounded by a border and comprises individual insulating webs 34 by means of which the first busbar 18 is separated from the second busbar 20 and the second busbar 20 is separated from the third busbar 22. The insulating piece 32 has an insulating-piece trough 36, which is surrounded by the border. The insulation of the first busbar 18, the second busbar 20 and the third busbar 22 with respect to one another is realized via the insulating pieces 34 running through the insulating piece 32.

Figure 3:
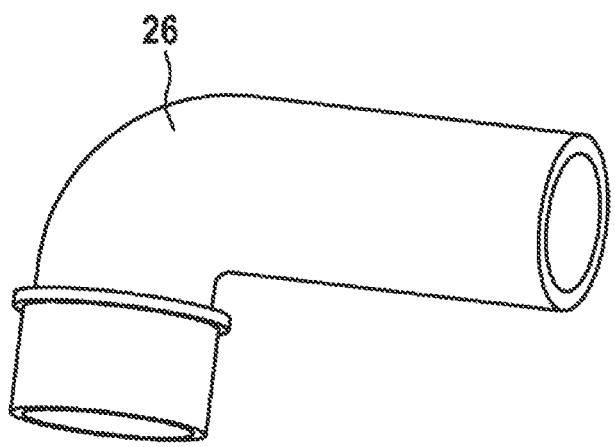
FIG. 3 a view of a pipe elbow installed in FIG. 1.

FIG. 3 shows a perspective view of a pipe elbow 26, which is manufactured from a metal material, for example, and conducts the cooling medium to the end shield 12 in which the electric machine is received.

Figure 4:
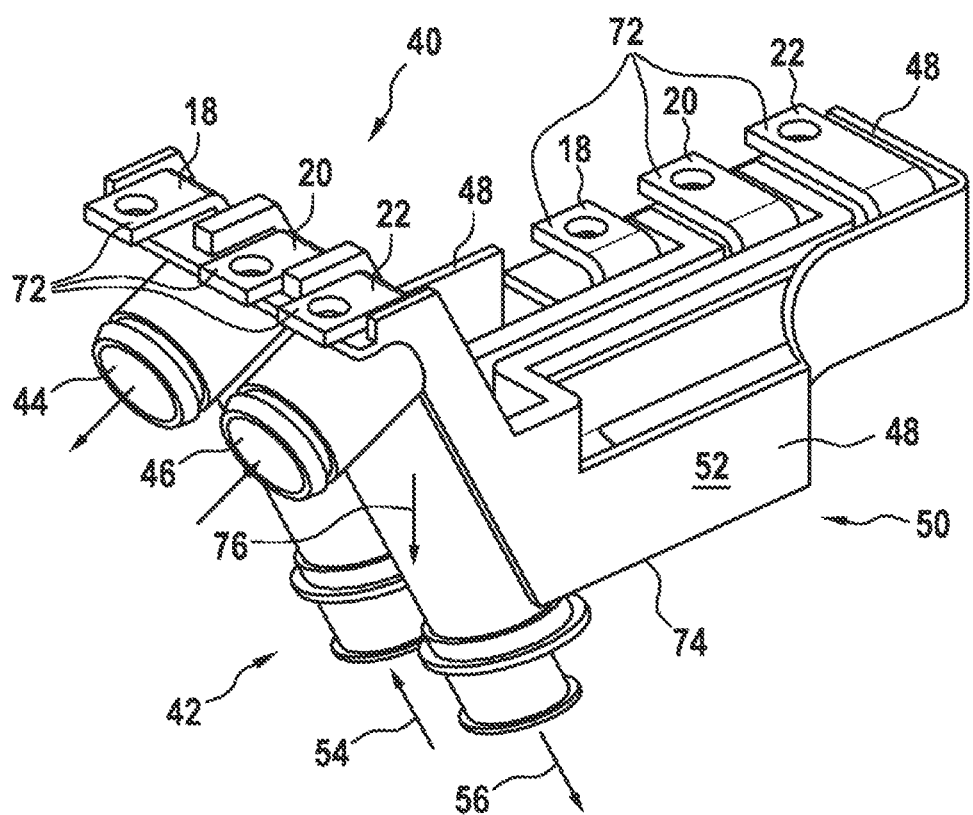
FIG. 4 a first single-part embodiment of the insulating device proposed according to the invention, with cooling-medium channels integrated at the end face.

FIG. 4 shows a first embodiment variant of the insulating device proposed according to the invention, with integrated cooling-medium channels.

The illustration according to FIG. 4 reveals that an insulating body 74, in which the first busbar 18, the second busbar 20 and the third busbar 22 are received such that they are insulated with respect to one another, is manufactured from a first plastic material 52, for example. In this illustration according to FIG. 4, this refers to an insulating body 74 which is produced from a first plastic material 52. For manufacturing reasons with regard to the first channel 44 and the second channel 46, the plastic injection molding method comes into consideration for the production of the insulating body 47. The first plastic material 52 is, for example, an electrically insulating plastic material optimized for the best possible heat conduction, such as Luvocom 1-8259 or Tecacomp PA 66 TC 3923, for example.

The illustration according to FIG. 4 reveals that the insulating body 74 of the insulating device 40 is formed in a single-part embodiment 50. The insulating body 74 is preferably manufactured in an operating procedure within the plastic injection molding process. The respective insulating webs 34 surrounded by a border 48 can also be manufactured in the plastic injection molding process. The first busbar 18 is electrically insulated from the second busbar 20 and the second busbar 20 is electrically insulated from the third busbar 22 by the insulating webs 34 which pass through the interior of the insulating body 74. The first, second and third busbars 18, 20, 22 comprise respective connection regions 72, which can be provided with a circular opening or the like, for example.

It can furthermore be seen from FIG. 4 that the first channel 44 and the second channel 46 run substantially in the vertical direction 76 at the end face 42 of the insulating body 74. An inflow 54 is preferably situated in the region in which more heat is to be dissipated, for example because a plurality of busbars 18, 20, 22 are arranged there or the busbars 18, 20 and 22 arranged there are longer, since the effectiveness for these is greater due to the lower coolant temperature.

The first busbar 18, the second busbar 20 and the third busbar 22 are formed in such a way that they have both portions which extend level with the base of the insulating body 74, and, rotated through 90° with respect thereto, vertically extending portions.

Figure 5:
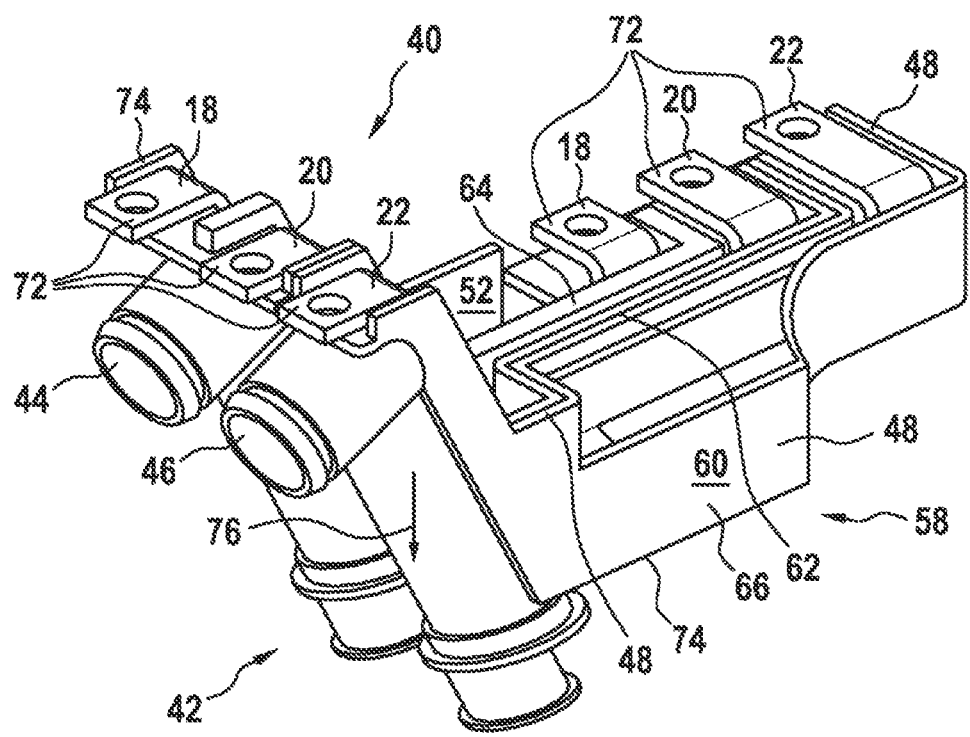
FIG. 5 a multi-part embodiment variant of the insulating device proposed according to the invention, with cooling-medium channels.

The illustration according to FIG. 5 reveals a perspective plan view of an insulating body 74, which is created in a multi-part embodiment 58. This means that, in the multi-part embodiment 58, the insulating device 40 proposed according to the invention comprises a first part 64 and a second part 66. Whilst, in the exemplary embodiment according to FIG. 5, the first part 64 receives the first busbar 18 and the second busbar 20, only the third busbar 22 is accommodated in the second part 66. The orientation of the connection regions 72 of the busbars 18, 20 and 22 in the embodiment variant as a multi-part embodiment 58 according to FIG. 5 does not alter in comparison to the single-part embodiment 50 according to FIG. 4. Whilst, for example, the first part 64 of the insulating body 74 is injection molded from the first plastic material 52, the second part 66 of the insulating body 74 according to the illustration in FIG. 5 could be injection molded from a second plastic material 60 which differs from the first plastic material. Common to both parts, the first part 64 and the second part 66, is that the first channel 44 and the second channel 46 are respectively injection molded at their mutually parallel-extending end faces 42. With reference to the first part 64, the first channel 44 is located at the end face 42. The second part 66 of the insulating device 40, on the other hand, receives the second channel 46 at its end face 42. Analogously to the illustration according to FIG. 4, i.e. to the single-part embodiment 50, the two channels 44, 46 likewise extend substantially in the vertical direction 76 along the first part 64 and the second part 66 at the end face 42 of the two parts 64 and 66 lying against one another along a joint 62.

In the embodiment variant, illustrated in FIG. 5, of the insulting body 74 of the insulating device 40 in a multi-part embodiment 58, the injection molding tool in which the first plastic material 52 or the second plastic material 60 are processed can be designed more simply. Furthermore, in the multi-part embodiment 58 illustrated in FIG. 5, leakage tolerances can be simplified when the insulating body 74 is constructed in two-parts with a first channel 44 provided on the first part 64 and a second channel 46 provided on the second part 66 respectively.

Figure 6:
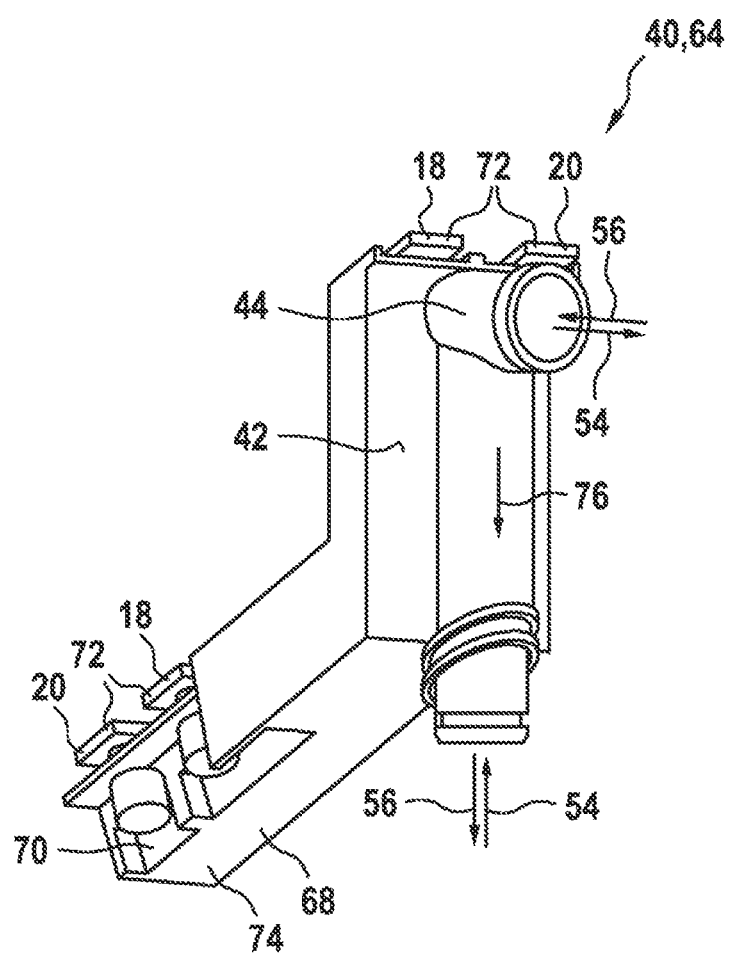
FIG. 6 a first part of the insulating device according to the invention, illustrated in FIG. 5 in a multi-part embodiment.

The illustration according to FIG. 6 reveals a first part 64 of the insulating body 74 in a multi-part embodiment.

As can be seen from the perspective view of the first part 64 of the insulating body 74 according to FIG. 6, the first channel 44 extends substantially in the vertical direction 76 at the end face 42 thereof. Both an inflow 54 and a discharge flow 56 of a cooling medium can flow through the first channel 44, as illustrated in FIG. 6. The inflow 54 is preferably located in the region in which more heat accumulates, for example if a plurality of busbars 18, 20, 22 are arranged there and these have a longer design.

The first part 64, illustrated in a perspective view in FIG. 6, of the insulating body 74 receives the first busbar 18 and the second busbar 20, which are electrically insulated with respect to one another by an insulating web 34 illustrated in FIG. 5. The first busbar 18 and the second busbar 20 have the respective connection regions 72 at their ends. A base portion of the first part 64 of the insulating device 40 is identified by reference sign 68 in the illustration according to FIG. 6. The first part 64 comprises a recess 70 so that the phase connections 16, c.f. illustration according to FIG. 1, of the electric machine 14 can be more easily connected to the connection regions 72 of the first busbar 18 and the second busbar 20.

In the illustrations according to FIGS. 4 and 5 and also 6, the busbars 18, 20 and 22 are generally partially incorporated as integrated parts in the respective insulating body 74 or in the first part 64 and the second part 66 thereof. To improve the heat transfer, a heat-conducting paste can be additionally provided. There is furthermore the option injecting the busbars 18 20 and 22 illustrated in the FIGS. 4, 5 and 6 into the respective plastic material 52 or 60 of the insulating body 74 or into the parts 64 and 66 thereof in order to thereby improve the heat transfer. To save on costs, there is furthermore the option of also producing the insulating body 74 of the insulating device 40 with integrated cooling-medium channels 44, 46 by means of a pre-injection-molded part or to use the multi-component injection molding process. The interior, for example, of the insulating body 74 can thus be manufactured from a more economical plastic material, and the more expensive first plastic material 52 having the particular relationship properties, or the second plastic material 60, are only used in the regions where this is absolutely necessary.

The busbars 18, 20 and 22 described above can also be created as wires as an alternative to their flat design; for example, as solid wires with a circular or other cross-section, as wrapped litz wires or as braided litz wires. If such geometries are selected for the busbars 18, 20, 22, the receiving geometry in the insulating body 74 is accordingly not flat, but hemispherical, for example; in any case complementary to the geometry of the busbars 18, 20 and 22 which are not designed with a flat structure. Heat-conducting paste can furthermore be used to improve the thermal coupling of the busbars 18, 20, 22—be they in a flat structure or designed as wires—to the plastic material of the insulating body 74.

The invention is not restricted to the exemplary embodiments described here and the aspects highlighted therein. Instead, multiple modifications within the capabilities of the person skilled in the art are possible within the scope specified by the claims.

The invention claimed is:

1. An insulating device (40) comprising an insulating body (74) with a plastic material (52, 60) in which busbars (18, 20, 22) are received, wherein cooling-medium channels (44, 46) are integrated in the plastic material (52, 60) of the insulating body (74) and wherein the cooling-medium channels (44, 46) are injection molded in a region of an end face (42) of the insulating body (74).

2. The insulating device (40) as claimed in claim 1, wherein the insulating device is formed in a single-part embodiment (50) or in a multi-part embodiment (58).

3. The insulating device (40) as claimed in claim 2, wherein the multi-part embodiment (58) of the insulating body (74) has a first part (64) and a second part (66).

4. The insulating device (40) as claimed in claim 3, wherein a first busbar (18) and a second busbar (20) are received in the first part (64), and the second part (66) receives a third busbar (22).

5. The insulating device (40) as claimed in claim 3, wherein the first part (64) and the second part (66) are manufactured from a first plastic material (52),
or the first part (64) and the second part (66) are manufactured from a second plastic material (60),
or the first part (64) is manufactured from the first plastic material (52) and the second part (66) is manufactured from the second plastic material (60) and vice versa.

6. The insulating device (40) as claimed in claim 3, wherein the parts (64, 66) of the insulating body (74) each have insulating webs (34) which insulate the busbars (18, 20, 22) with respect to one another.

7. The insulating device (40) as claimed in claim 2, wherein the insulating body (74) in the single-part embodiment (50) has insulating webs (34) which separate the busbars (18, 20, 22) from one another.

8. The insulating device (40) as claimed in claim 1, wherein the cooling-medium channels (44, 46) run substantially in a vertical direction (76).

9. The insulating device (40) as claimed in claim 1, wherein the plastic material (52) is an electrically insulating plastic material optimized for the best possible heat conduction.

10. The insulating device (40) as claimed in claim 1, wherein the insulating body (74) receives a heat-conducting paste in which the busbars (18, 20, 22) are embedded.

11. The insulating device (40) as claimed in claim 1, wherein the busbars (18, 20, 22) are injected into the plastic material (52, 60) of the insulating body (74).

12. The insulating device (40) as claimed in claim 1, wherein the insulating body (74) comprises a pre-injection-molded part or is manufactured in a multi-component technique and a heat-conducting plastic material is only injected into the regions in which the heat-conducting plastic material is necessary.

13. The insulating device (40) as claimed in claim 1, wherein the plastic material (52) is Luvocom 1-8259 or Tecacomp PA 66 TC 3923.

14. An electric machine comprising the insulating device (40) as claimed in claim 1 for electrical contacting and for cooling of the electric machine (14).

15. The electric machine as claimed in claim 14 wherein the electric machine is part of an electric vehicle (EV), a hybrid electric vehicle (HEV) or a plug-in hybrid electric vehicle (PHEV).

16. An insulating device (40) comprising an insulating body (74) with a plastic material (52, 60) in which busbars (18, 20, 22) are received, wherein cooling-medium channels (44, 46) are integrated in the plastic material (52, 60) of the insulating body (74), and wherein the cooling-medium channels (44, 46) run substantially in a vertical direction (76).

17. An insulating device (40) comprising an insulating body (74) with a plastic material (52, 60) in which busbars (18, 20, 22) are received, wherein cooling-medium channels (44, 46) are integrated in the plastic material (52, 60) of the insulating body (74), and wherein the insulating device is formed in a multi-part embodiment (58) having a first part (64) and a second part (66).

18. The insulating device (40) as claimed in claim 17, wherein a first busbar (18) and a second busbar (20) are received in the first part (64), and the second part (66) receives a third busbar (22).

19. The insulating device (40) as claimed in claim 18, wherein the insulating body (74) receives a heat-conducting paste in which the busbars (18, 20, 22) are embedded.

20. The insulating device (40) as claimed in claim 18, wherein the busbars (18, 20, 22) are injected into the plastic material (52, 60) of the insulating body (74).

* * * * *